A. A. VAN ORSDALE.
LUBRICATOR.
APPLICATION FILED OCT. 25, 1920.
1,401,835. Patented Dec. 27, 1921.
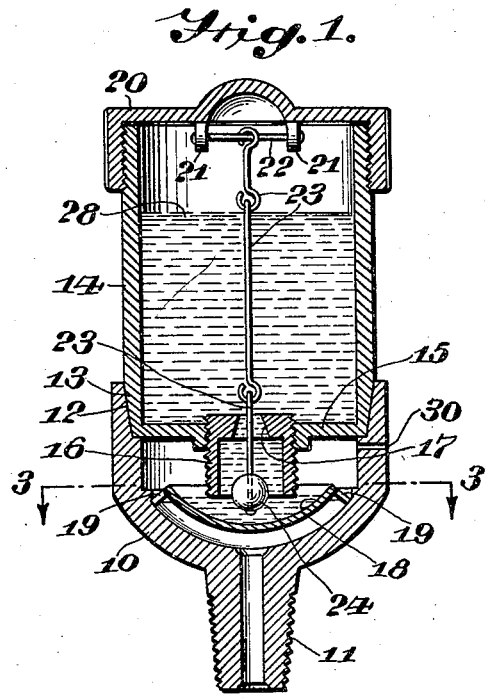
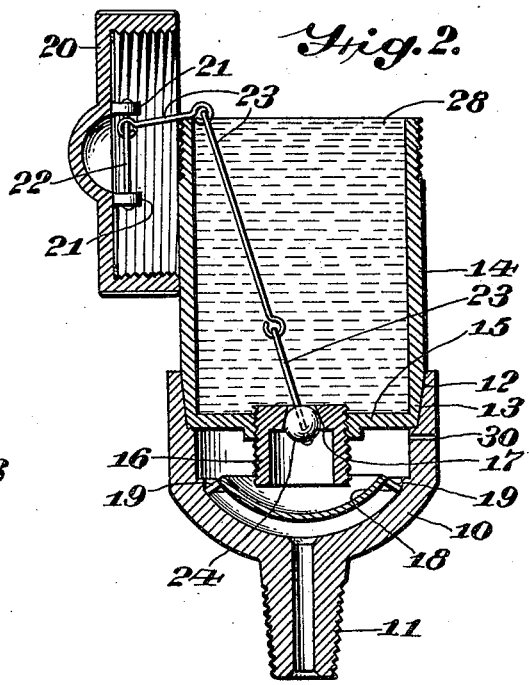
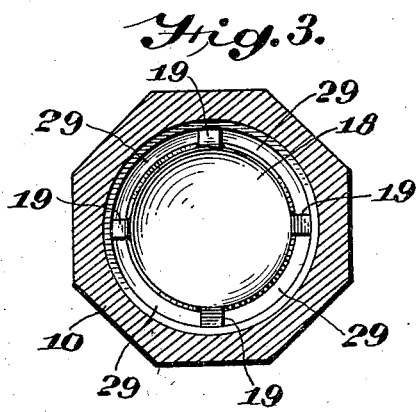
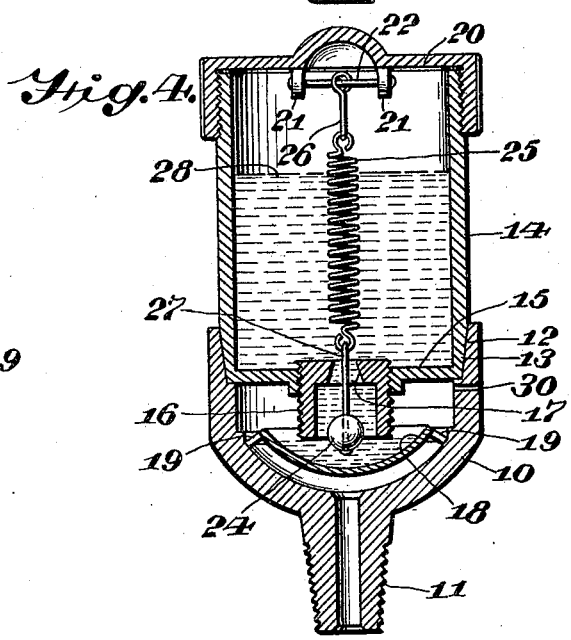
Allen A. Van Orsdale
INVENTOR
BY Victor J. Evans
ATTORNEY
Alfred J. Bratton.
WITNESS:

UNITED STATES PATENT OFFICE.

ALLEN A. VAN ORSDALE, OF PHILADELPHIA, PENNSYLVANIA, ASSIGNOR TO CELESTIN SANER, OF PHILADELPHIA, PENNSYLVANIA.

LUBRICATOR.

1,401,835.   Specification of Letters Patent.   Patented Dec. 27, 1921.

Application filed October 25, 1920. Serial No. 419,312.

*To all whom it may concern:*

Be it known that I, ALLEN A. VAN ORSDALE, a citizen of the United States, residing at Philadelphia, in the county of Philadelphia and State of Pennsylvania, have invented new and useful Improvements in Lubricators, of which the following is a specification.

This invention relates to lubricators and it has more particular reference to that type of device in which the feed of the lubricant is automatically brought about as a result of the vibrations set up by the moving or vibrating part on which said device is used, whereas when the moving or vibrating part is stopped or brought to a state of rest, the feed of lubricant thereto simultaneously ceases.

The main object of my present invention is to provide a lubricator of the type referred to in which the valve controlling the flow of the lubricant from the reservoir to the feed device proper is adapted to be automatically closed by the removal of the reservoir cover when it is necessary to replenish the said reservoir.

Another object of this invention is to provide a lubricator of the type referred to which is novel in construction, comprises but few parts which can be readily assembled, and one that is furthermore capable of the maximum efficiency in use.

With the foregoing primary objects in view, my present invention consists essentially in the novel features of construction, combination and arrangement of parts hereinafter fully described and more specifically defined by the appended claims.

Figure 1— is a central vertical section through a lubricator embodying my present improvements.

Fig. 2— is a similar vertical section showing the cover removed or in the position when the valve is closed, for refilling the lubricant container.

Fig. 3— is a sectional plan taken approximately on the line 3—3 in Fig. 1, and

Fig. 4— is a central vertical section of a slightly modified form of the invention.

Referring more particularly to the views, the numeral 10 designates what may be termed a basal portion of the lubricator which is provided with a threaded extension 11 whereby the lubricator may be screwed in position. This basal portion 10 is formed at its upper part with an inwardly inclined shoulder 12 in which is adapted to frictionally seat, the correspondingly tapered lower end 13 of the lubricant reservoir 14 which is provided with a centrally threaded bottom 15 into which is screwed a correspondingly threaded cylindrical member 16, said member 16 consituting a cylindrical extension and being provided with a valve seat 17 preferably of a conical nature. Seated in the spherical ended basal portion 10 is a concavo-convex or dish diaphragm 18, which is provided with diametrically opposed lugs or ears 19 of a more or less springy nature and which are adapted to firmly support said concavo-convex diaphragm in place. A cover or cap 20 is threaded on to the top of the lubricant container or reservoir 14 and it is provided with a pair of diametrically opposed depending lugs 21 which support a cross bar or pin 22. This pin or cross bar 22 provides a support for a series of link members 23 on the lower or free end of which there is threaded or otherwise adjustably mounted a ball valve 24.

Instead of employing the series of link members 23, I may substitute a contractile spring 25 as shown in the modified form of the invention illustrated by Fig. 4, it being obvious in this instance that upper and lower links 26, 27, respectively, may be employed for connecting the said spring 25 to the cross bar 22 and for the attachment of the ball valve 24.

From the foregoing it will be readily seen that by my invention I provide an extremely simple and novel structure of lubricator, the various parts whereof, can be readily assembled, while it is to be further noted that the cylindrical extension or externally threaded member 16 provides means for easily and expeditiously adjusting the normal level of the lubricant in the concavo-convex insert or diaphragm 18. Furthermore it will be readily seen on an examination of Figs. 1 and 2, more particularly, that when the cap or cover 20 is screwed down in place, the ball valve 24 positions away from the conical seat 17 and allows the lubricant indicated by the numeral 28 to flow therethrough into the concavo-convex diaphragm or dished member 18 until it rises to a level in the latter, alining with the bottom of the cylindrical extension 16. Now assuming that the part of the machine or engine on which the lubricator is mounted is subjected to a vibratory action, such vibrations will cause the lubricant contained in the diaphragm 18 to be washed over the edges thereof, or in other words the spaces 29 intervening between the above referred to lugs or ears 19. Furthermore it will be clearly seen that the frequency of vibration will cause a correspondingly increased or decreased feed of the lubricant and that by providing an air vent 30 there will be a prompt replacement of the air which will be caused to bubble up through or pass the lower end of the extension 16, said air bubbling up through the lubricant 28 into the upper part of the container 14.

Now when it is desired to replenish the supply of lubricant in the container 14, it is simply necessary to unscrew the cap or cover until it becomes detached therefrom, said action causing the ball valve 24 to be brought up into frictional or seating engagement with the conical part 17 and as will be readily seen from Fig. 2, the weight of said cover 20 will maintain said ball valve firmly seated thereagainst. It is also to be particularly noted that the cross bar 22 makes provision for the lid 20 sliding downwardly into the position indicated in Fig. 2 and which greatly facilitates the maintenance of the ball valve 24 upon its seat. In this position it will be clearly seen, that the lubricant reservoir or container 14 can be readily refilled without any fear of said lubricant flowing past the ball valve 24. Replacement of the cover 20 on the container will obviously release the ball valve 24 and cause the lubricant to flow through the cylindrical extension 16 into the concavo-convex diaphragm or dished portion 18 until it assumes the level shown in Fig. 1, whereupon the lubricator will be ready for use.

In the form of my invention shown in Fig. 4, it will be obvious that the substitution of the contractile connection 25 between the valve 24 and cross bar 22, will greatly insure the proper seating of the ball valve 24 when the cover is removed for refilling the reservoir or container 14. While I have shown and described a practical embodiment of my invention, I wish it understood that I do not limit myself to the precise details of construction disclosed, as various changes in the shape and arrangement of the parts can be readily effected without departing from the spirit and scope thereof, for example; the cap or cover 20 may be made a friction fit on the lubricant reservoir or container 14. Still further the lower body portion or screw extension 11 from the basal portion 10 may be elbowed or angled to accommodate the application of my improved lubricator in normally inaccessible positions, and it is hereby intended to include all such reasonable modifications as may fairly be construed as falling within the scope of the appended claims.

Having described my invention, I claim—

1. A vibratory-feed lubricator comprising a lubricant reservoir having an outlet therefrom, a supplemental chamber seated below the lubricant reservoir, a dished diaphragm supported in said supplemental chamber by radially projecting tongues forming peripheral apertures for the passing of the lubricant, an adjustable extension mounted in the aforesaid reservoir outlet and having a valve seat therein, a cover for the reservoir, a valve for coöperation with the valve seat, and means connecting the valve and cover so that when the latter is removed for filling the reservoir, said valve is closed on its seat.

2. A vibratory-feed lubricator comprising a lubricant reservoir having a threaded outlet therefrom, a supplemental chamber frictionally held on the lower end of the lubricant reservoir and having a dished basal portion, a dished diaphragm seated in said basal portion and in spaced relation thereto by diametrically opposed downwardly inclined tongues forming peripheral apertures for the passage of the lubricant, a cylindrical extension threaded into the aforesaid reservoir outlet and having a valve seat in its upper end, a cover for threaded engagement on the upper end of the lubricant reservoir, a valve for coöperation with the valve seat, and means connecting the valve and cover so that when the latter is removed for filling the reservoir, said valve is firmly closed on its seat.

3. A vibratory-feed lubricator comprising a lubricant reservoir having a threaded outlet therefrom, a supplemental chamber frictionally fitted on the lower end of the lubricant reservoir and having a concavo-convex basal portion, a concavo-convex diaphragm seated in spaced relation in said basal portion by diametrically opposed inwardly inclined tongues thus forming peripheral apertures for the passage of the lubricant, an adjustable cylindrical extension threaded into the aforesaid reservoir outlet and having a conical valve seat in its upper end, a cover for threaded engagement on the upper end of the lubricant reservoir, a ball valve for coöperation with the conical valve seat, and contractile means connecting the valve and cover so that when the latter is removed for filling the reservoir, said valve is held firmly to the aforesaid valve seat.

4. A vibratory-feed lubricator comprising a reservoir having a threaded outlet therefrom, a supplemental chamber frictionally fitted on the lower end of the lubricant reservoir and having a dished basal portion, a dished diaphragm seated in said basal portion by diametrically opposed tongues forming peripheral apertures for the passage of the lubricant, an adjustable extension threaded into the reservoir outlet and having a conical valve seat in its upper end, a cover for threaded engagement on the lubricant reservoir and having spaced lugs depending therefrom, a cross bar supported by said lugs, and a contractile spring depending from said cross bar and having an adjustable ball valve at the free end thereof, said contractile spring being adapted to hold the ball valve firmly closed on its seat when the threaded cover is removed.

In testimony whereof I affix my signature.

ALLEN A. VAN ORSDALE.